United States Patent [19]

Yogev et al.

[11] Patent Number: 4,760,705
[45] Date of Patent: Aug. 2, 1988

[54] RANKINE CYCLE POWER PLANT WITH IMPROVED ORGANIC WORKING FLUID

[75] Inventors: Amnon Yogev, Rehovot; David Mahlab, Tel Aviv, both of Israel

[73] Assignee: Ormat Turbines Ltd., Yavne, Israel

[21] Appl. No.: 933,349

[22] Filed: Nov. 19, 1986

Related U.S. Application Data

[63] Continuation of Ser. No. 759,520, Jul. 29, 1985, abandoned, which is a continuation of Ser. No. 499,557, May 31, 1983, abandoned.

[51] Int. Cl.⁴ ............................................. F01K 25/10
[52] U.S. Cl. ...................................... 60/651; 60/671; 60/641.8
[58] Field of Search ................................ 60/651, 671

[56] References Cited

U.S. PATENT DOCUMENTS

| | | | |
|---|---|---|---|
| 1,015,777 | 1/1912 | Bradley | 60/651 |
| 3,040,528 | 3/1960 | Tabor et al. | 69/36 |
| 3,234,734 | 2/1966 | Buss et al. | 60/651 |
| 3,516,249 | 6/1970 | Paxton | 60/655 X |
| 4,400,946 | 8/1983 | Oplatka | 60/641.8 |

FOREIGN PATENT DOCUMENTS 280926 9/1928 United Kingdom ............... 60/671

*Primary Examiner*—Allen M. Ostrager
*Attorney, Agent, or Firm*—Sandler & Greenblum

[57] ABSTRACT

A Rankine cycle power plant utilizes as a working fluid and compounds selected from the group consisting of bicyclic hydrocarbons, substituted bicyclic aromatic hydrocarbons, heterocyclic bicyclic aromatic hydrocarbons, substituted heterocyclic bicyclic aromatic hydrocarbons, bicyclic compounds where one ring is aromatic and the other condensed ring is non-aromatic, and their mixtures.

25 Claims, 2 Drawing Sheets

PHYSICAL PROPERTIES OF TETRALENE

| STATE | ENTHALPY [KJ/Kg°K] | PRESSURE [BAR] | DENSITY [M³/Kg] |
|---|---|---|---|
| A | 364 | 0.20 | 0.00122 |
| B | 696 | 5.15 | 0.00145 |
| C | 964 | 5.15 | 0.065 |
| D | 712 | 0.20 | 1.282 |

VISCOSITY @ -20°C ~ 4.3 CP
VAPOR PRESS @ 370°C ~ 15.5 BAR
THERMAL CONDUCTIVITY { @ 37°C ~ 0.11 BTU/HRFT°F
{ @ 300°C ~ 0.065

| FLUID | VAPOR PRESSURE (BAR) | |
|---|---|---|
|  | 300°C | 374°C |
| WATER | 85 | 220 |
| TETRALENE | 5.8 | 16 |
| NAPTHALENE | 4.9 | 13.6 |
| 1-METHYL NAPTHALENE | 3 | 9 |

RANKINE CYCLE POWER PLANT WITH IMPROVED ORGANIC WORKING FLUID

This application is a continuation, of application Ser. No. 759,520, filed July 29, 1985 which is a continuation of Ser. No. 499,557, filed May 31, 1983, both abandoned.

DESCRIPTION

TECHNICAL FIELD

This invention relates to a Rankine cycle power plant operating with an improved organic working fluid.

BACKGROUND ART

Rankine cycle power plants operating with an organic working fluid are known in the art. Such a power plant comprises a boiler for vaporizing the working fluid, a turbine responsive to vaporized working fluid produced by the boiler for expanding the vapor and producing work, a generator coupled to the turbine for converting the work produced thereby into electrical energy, and a condenser for condensing expanded vaporized working fluid exhausted from the turbine and producing condensate that is returned to boiler either by pump or under the influence of gravity. A power plant of this type, hereinafter refered to as a power plant of the type described, is commercially available by Ormat Turbines Ltd. and is described in the Patent literature, in, for example, U.S. Pat. No. 3,040,528.

Power plants of the type described are in current use throughout the world for supplying electrical energy for telecommunication relay stations, for example, and other installations where the power required is in the 300-3000 W range, and reliability is critical. Reliability is enhanced in a power plant of the type described by utilizing an air cooled condenser, by mounting the turbine and generator on a common shaft (turbogenerator) and hermetically enclosing these components in a cannister, by diverting a small portion of the condensate from the condenser to the bearings of the turbogenerator in order to effect long term operations without wear, and by controlling the voltage of the generator by on/off operation of the fuel supplied to the boiler.

Conventionally, the working fluid is a fluorinated hydrocarbon such a Freon, trichlorobenzene, etc; and the turbine operating conditions for trichlorobenzene are about 160 deg. C. and below atmospheric pressure while the air cooled condenser operates at 70 deg. C. and much less than atmospheric pressure. Under these conditions of temperature and pressure conventional working fluids are stable with time in the presence of copper, stainless steel, low carbon steel, aluminum and brass, or metals that are used in the construction of the power plant of the type described. In addition, these conventional working fluids have thermodynamic proprieties which permit the working fluids to be used advantageously in a Rankine cycle power plant of the type described.

In order to up-size power plants of the type described by an order of magnitude or more so as to utilize low grade heat sources, such as waste heat, geothermal heat, and solar heat, a larger turbine operating at higher pressures and temperatures must be utilized if the size of the turbine is to be kept to reasonable dimension. Conventional working fluids such as fluorinated hydrocarbons prove to be unstable with time in the presence of the usual metals found in power plants when the operating temperature is in the range 300-400 deg. C. Moreover, as the capacity of power plant of the type described increases, the bearing loads on the turbine also increase; and it is not always practical to construct both the turbine and generator as a single unit enclosed in a hermetically seal cannister as is done conventionally on small capacity power plant.

As a consequence, a 750 kW or larger power plant of the type described (such as would be operable to generate power from a waste heat or a geothermal source, for example) would normally have a single stage turbine mounted in its own housing with the rotor journaled in bearings mounted in housing, and a seperately housed generator coupled to the output shaft of the turbine. Thus, efficient seals are required, particularly if the turbine housing is under a vacuum, which would permit ambient water vapor to leak into the house. With many types of conventional working fluids, water vapor chemically reacts with the working fluid in the temperature range utilized and produces constituents that are corrosive to the various metals used in constructing the power plant. Increased maintenance and expense in operation result.

Another disadvantage with many conventional working fluids is their relatively high freezing point. For example, the freezing point of commercial trichlorobenzene is about 10 deg. C. which would render the power plant incapable of "cold-starting" in many places in the world. While expedients ar known by which mixtures of different working fluids can be used in order to suppress the freezing point of the combination, this approach to solving the problems encountered in using power plants of the type described in cold regions is not always satisfactory.

It is therfore an object of the present invention to provide a new and improved organic working fluid suitable to a power plant of the type described wherein the working fluid is more stable and provides improved results.

BRIEF DESCRIPTION OF INVENTION

According to the present invention, the working fluid is a compound selected from the group consisting of bicyclic aromatic hydrocarbons, substituted bicyclic aromatic hydrocarbons, heterobicyclic aromatic hydrocarbons, substituted heterocyclic aromatic hydrocarbons, bicyclic or heterobicyclic compounds where one ring is aromatic and the other condensed ring is non-aromatic, and their mixtures.

Compounds in such group are inherently stable in the temperature range of interest and have a good thermodynamic properties. The molecular weight of such compounds is less than the molecular weight of many conventional working fluids and this results in a lower Mach number at the turbine exit thereby increasing the efficiency of the turbine.

The present invention is particularly useful for power plants of the type described wherein the heat for operation is obtained from solar heating of the working fluid. The working fluid circulates in the primary solar collector. Part of it is vaporized by flashing to obtain high pressure and high temperature vapor for the turbine of the power plant in the range of 300–400 deg. C. and 3–6 atmosphere pressure. The cool condensate produced by the condenser is preheated in a secondary solar collector before being returned to the sump of the flash chamber from which liquid is returned by pump to the primary solar collector.

The liquids belonging to this group are known to be stable under conditions of radiation within nuclear power plants and are therefore suitable as cooling liquids in nuclear reactors operating at temperatures under 400 deg. C. The same liquids can be used in nuclear power plants both as cooling liquids and/or working fluids for the turbines. In this way, the need for very expensive heat exchangers could be eliminated. The advantage of this is that the power plant would then operate at relatively low vapor pressure, approximately 3-7 atm. In conventional nuclear reactors the operating pressure can be over 100 atm. Thus, in the the present invention, cost of construction, installation and safety devices is reduced. In power plants operating above 150 deg. C., it is normal practice to use water as a working fluid and the pressure obtained may exceed 100 atm. In addition when using water as a working fluid, intensive superheating by way of heat exchangers is required. Low pressure organic cooled nuclear reactors have been operated in the past, but with a liquid unsuitable for driving a turbine. The advantage of the fluids in the present invention is that they can be used as a working fluid to drive a power plant, eliminate the expensive high pressure devices, the boiler and superheater heat exchangers and the need for corrosive conditioning.

In a further aspect of the invention, a binary Rankine cycle power plant is provided in which the condenser of the high temperature and pressure turbine is cooled by a different working fluid which is vaporized thereby and supplied to a low temperature and pressure turbine.

DESCRIPTION OF DRAWINGS

Embodiments of the present invention are shown in the accompanying drawings wherein.

DETAILED DESCRIPTION

Figure 1:
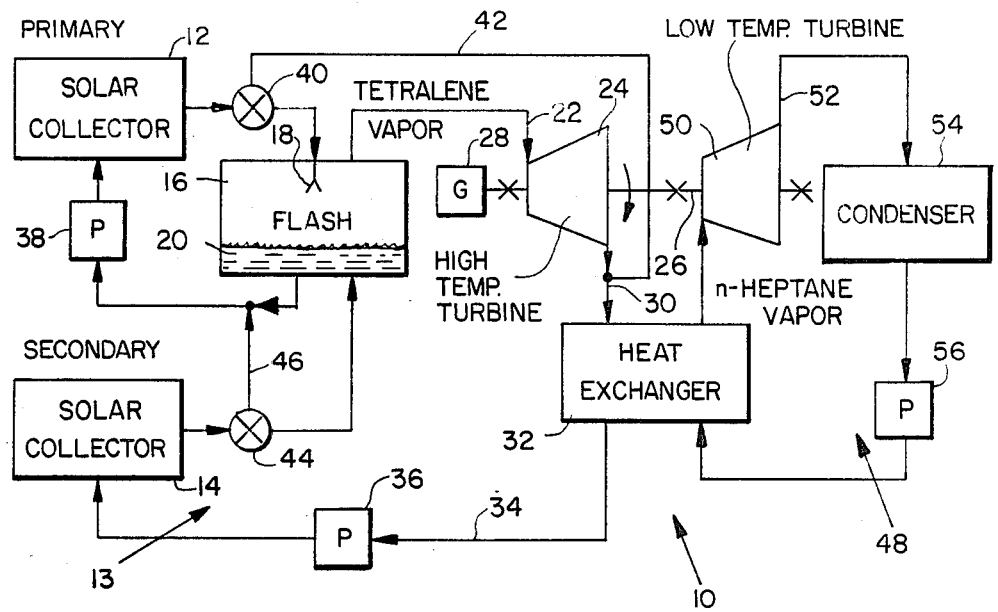
FIG. 1 is a block diagram of a power plant of the type described into which the present invention is incorporated.

Refering now to FIG. 1, reference numeral 10 designates a first embodiment of a power plant of the type described according to the present invention. Power plant 10 is in a form of a binary Rankine cycle power plant comprising high pressure portion 13 and low pressure portion 48, each having different associated working fluids. The heat source for this power plant is constituted by a pair of solar collectors, the primary solar collector being designated by reference numeral 12 and the secondary solar collector being designated by reference numeral 14. Collectors 12 and 14 are conventional in nature and serve to collect and focus solar energy on a series of tubes containing liquid working fluid. Heated working fluid produced by solar collector 12 is piped to flash chamber 16 through control valve 40 and then through throtting valve 18 which produces a pressure drop that flashes the heated working fluid into vapor within chamber 16. That portion of the liquid not flashed into vapor collects at the bottom of flash chamber 16 in sump 20.

Vaporized working fluid passes through inlet conduit 22 into the nozzles (not shown) of high temperature turbine 24 wherein, expansion occurs causing the turbine to do work by rotation of shaft 26. Generator 28 coupled to shaft 26 converts the work produced by turbine 24 into electrical energy.

Cooled and expanded working fluid exhausted from turbine 24 is transported by exhaust line 30 to closed, counter-flow heat exchanger 32. A second working fluid is also applied to heat exchanger 32 for the purpose of cooling the vaporized first working fluid. As a consequence, condensate of the first working fluid is collected in conduit 34 and is applied by pump 36 to secondary solar collector 14 wherein solar energy reheats the cooled condensate to a temperature close to the temperature of the liquid in sump 20 of flash chamber 16 and returns the heated condensate to sump 20. Pump 38 returns liquid in sump 22 to primary solar collector 12 enabling the working fluid cycle to repeat.

Valve 40 in the line connecting primary solar collector 12 to flash chamber 16 is normally in a position that effects the transfer of hot working fluid into the flash chamber and to block flow into conduit 42 which is connected to the exhaust manifold 30 of turbine 24. Valve 44 at the outlet to secondary collector 14 is also normally in a position to permit heated condensate to enter sump 20 instead of being diverted through conduit 46 directly to the input side of pump 38.

Low temperature, low pressure portion 48 of the power plant is constituted by one side of heat exchanger 32 within which the low temperature working fluid circulates for the purpose of condensing the high temperature working fluid contained in portion 13 of the binary power plant. Heat exchanger 32 thus converts the liquid working fluid in portion 48 of the power plant into a vapor which is applied to low temperature turbine 50 which, preferably, is also coupled to shaft 26 enabling the work extracted from the second working fluid by turbine 50 to be converted into electrical energy by generator 28.

Cooled working fluid in the vapor state is exhausted from turbine 50 through conduit 52 and applied to condenser 54 wherein the exhausted vaporized fluid is condensed. The resultant condensate produced by condenser 54 is applied via pump 56 to heat exchanger 32 for completing the cycle of the second working fluid.

In one embodiment of the invention, the working fluid in portion 13 of the power plant is tetralin which is a bicyclic compound wherein one ring is aromatic and the other condensed ring is not aromatic. Tetralin (which chemically is tetra-hydro-naphtalene) has a freezing point of −35 deg. C. and is suitable for many cold weather applications.

Liquid tetralin contained in solar collector 12 is typically heated to about 302 deg. C. and a pressure of about 5.8 bar by the collector. Flash chamber 16 will typically have a pressure of about 5 bar producing a liquid in sump 20 at about 297 deg. C. Tetralin vapor entering high temperature turbine 24 will be at about 290 deg. C. with a pressure of about 5 bar. The vaporized tetralin expands in the turbine 24 and exhausts at a pressure, typically of about 0.2 bar. Condensation of the tetralin exhausted from turbine 24 occurs in heat exchanger 32 whereby the condensate is about 150 deg. C. and a pressure of about 0.2 bar. Pump 36 pumps the condensate to collector 13 which heats the condensate to a temperature of about 297 deg. C. and returns the heated condensate to sump 20.

Portion 48 of the binary power plant contains n-heptane as the working fluid. The operation of heat exchanger 32 vaporizes the heptane and supplies vaporized heptane at about 140 deg. C. and 3 bar pressure to the inlet of low temperature turbine 50 wherein the heptane expands to a pressure of about 0.12 bar and a temperature of about 40 deg. C. An air cooled condenser is envisioned for condenser 32. When the flow rate of tetralin in the primary cycle 13 is about 5 kg/sec, the gross power produced by the turbines 24 and 50 will be about 735 kW. The pumping power required is such that the net power produced by the power plant is about 715 kW.

By utilizing flash chamber 16, all the working fluid in solar collector 12 will remain in a liquid state allowing the collector to operate most efficiently. The pressure drop in chamber 16 due to throttle valve 18 is only about 0.5 bar; and this arrangement provides for efficient utilization of a solar collector.

Valves 40 and 44 also function as bypass valves which are operated in the event that the solar input to collectors 12 and 14 is inadequate to properly operate portion 13 of of the power plant. When ambient conditions thus warrant, valves 40 and 44 are operated to bypass the flash chamber 16 and turbine 24. In such case, the primary working fluid is circulated serially through both solar collectors 12 and 14 and into heat exchanger 32 so that the low temperature portion 48 of the power plant can continue to operate.

Figures 3, 4, 5:
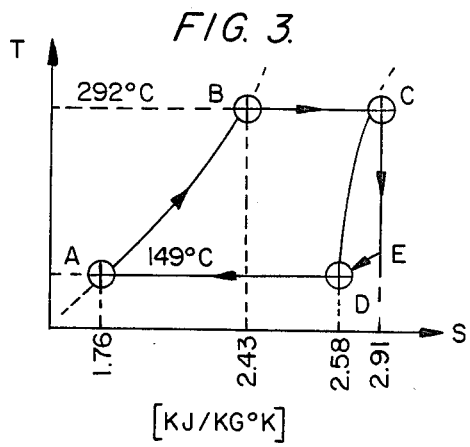
FIG. 3 is a portion of a temperature-entropy diagram for tetralin, which is a bicyclic compound wherein one ring is aromatic and the other condensed ring is not aromatic.
FIG. 4 is a chart listing the enthalpy, pressure and volume of tetralin at the various states shown in the diagram of FIG. 3.
FIG. 5 is a chart comparing the vapor pressure of some of the compounds of the present invention with that of water.

The preferred working fluid for high pressure and high temperature portion 13 of the power plant is tetralin whose T-S diagram is shown in FIG. 3. State A occurs at the input to solar collector 14 here the entropy of the tetralin is about 1.76 KJ/KG deg. K. Solar collectors 12 and 14 raise the temperature from about 149 deg. C. to about 300 deg. C. and the state is changed to state B. Vaporization in flash chamber 16 produces a change from state B to state C; and expansion through turbine 24 produces a change from state C to D.

The T-S diagram for tetralin is shaped with a negative slope along the saturated vapor line so that expansion of the working fluid in turbine 24 occurs in the superheated region. Thus, the turbine blades are not subjected to droplets of condensed working fluid. FIG. 4 summarizes the indicated physical properties of tetralin in the various states shown in FIG. 3.

A stability test on tetralin at temperatures in excess of 300 deg. C. in the presence of metals commonly found in power plants such as aluminum, brass, steel, and stainless steel as well as low carbon steel has shown that the working fluid at this temperature has no effect on these metals, and they have no effect on the working fluid. Decomposition of tetralin could not be detected at these temperatures during the test. At the vicinity of 400 deg., the decomposition rate of tetralin was low.

The present invention contemplates that the working fluid is a compound selected from the group consisting of bicyclic aromatic hydrocarbons, substituted bicyclic aromatic hydrocarbon, heterobicyclic aromatic hydrocarbons, substituted heterobicyclic aromatic hydrocarbons, bicyclic or heterobicyclic compounds where one ring is aromatic and the other condensed ring is not aromatic, and their mixtures. This group is sometimes hereinafter referred to as working fluids of the present invention. Examples of suitable bicyclic hydrocarbons are naphthalene having a freezing point of 80.5 deg. C. and 1-methyl naphthalene with a freezing point of −22 deg. C., and 2-methyl-napthalene with a freezing point of 35 deg. C. Examples of substituted heterocyclic aromatic hydrocarbons are quinoline, with a freezing point of −50 deg. C. and benzthiophene. Tetralin is a bicyclic compound where one ring is aromatic and the other condensed ring is not aromatic.

According to the invention a mixture of fluids may be used wherein the overall mixture has a freezing point which is lower than the freezing point of in the compound of the mixture having the highest freezing point.

The compounds in the group described above have high stability in the presence of aluminum, brass, steel, stainless steel and low grade carbon steel up to 400 deg. C. Their high Rankine cycle efficiency at a given temperature, and their relatively low melting point allow them to be used in an almost ambient conditions when the condenser is air cooled.

Further improvement can be obtained by adding low molecular weight compounds, e.g. methanol in order to reduce the Mach number at the turbine exit. By the addition of about 0.6% by weight of methanol to quinoline, the boiler will operate at 240 deg. C., and the Mach number of the mixture is reduced from 3.6 to 2.9 when the condenser temperature is 50 deg. C. The addition of methanol to quinolene reduces the average molecular weight thereby resulting in the improvement of Mach number. The composition of the vapor is about 20% by weight of methanol and about 80% by weight of quinolene.

The thermodynamic efficiency of the cycle can be improved by the use of mixtures. For example, by combining quinoline, which is a "dry" type of fluid with a negative curvature of the saturated vapor line on the T-S diagram, with methanol, which is a "wet" type of fluid, with a T-S diagram like that of water, the resulting mixture will have a T-S diagram wherein the saturated vapor a line is almost perpendicular to the entropy axis.

A saturated mixture of methanol with tetralin will reduce the melting point from about −35 deg. C. to lower than −45 deg. C. and will be suitable for many arctic conditions. Mixtures of working fluids of the present invention permit selection of still lower freezing points and intermediate thermodynamic properties. For example, a mixture of 75% tetralin and 25% methyl naphtalene has a freezing point of −70 deg. C. tetralin alone has a freezing point of −35 deg. C.; and methyl naphthalene alone has a freezing point of −10 deg. C.

Another feature of the present invention arises in the ability of the compound selected from the group identified above to be used with continuous heat sources such as nuclear reactors and waste heat in the form of stack gases or exhaust gas turbine and or diesel engines. When the heat source is a nuclear reactor, naphthalene, which has a relatively high freezing point, can be used advantageously because "cold starting" is not a requirement. Saturated naphthalene vapor at 300 deg. C. has a pressure of about 5 bar; and these conditions eliminate the need for special piping to withstand high pressures, as well as the need for heavy and costly containment buildings usually associated with nuclear reactor power plants.

Figure 2:
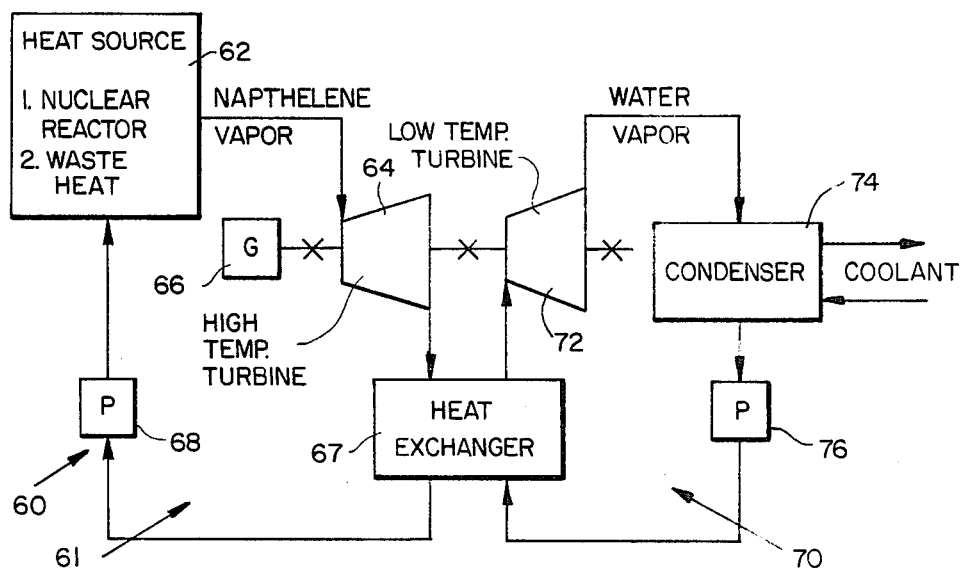
FIG. 2 is a block diagram of the modification of the block diagram of FIG. 1.

The embodiment of the invention in FIG. 2, illustrates a low-pressure nuclear reactor power plant utilizing naphthalene as the working fluid. Power plant 60 is a binary cycle plant having high pressure portion 61 and low pressure portion 70. Heat source 62 in high pressure portion 61 is a nuclear reactor which produces naphthalene vapor at the temperature and pressure indicated above. Vaporized naphthalene is applied to high temperature turbine 64; and the naphthalene expands in the turbine causing the latter to produce work which is converted into electrical energy by generator 66. Naphthalene vapors exhausted from turbine 64 are applied to counter-flow heat exchanger 67 where the naphthalene vapor condenses. The condensate is applied by pump 68 to the heat source 62 and the cycle repeats. The heat exchanger will operate typically, at about 150 deg. C., where its vapor pressure is about 0.16 bar. No high pressure piping for the working fluid is required; and by reason of the low pressures involved, no special containment for the nuclear reactor heat source is required.

Heat exchanger 67 heats another working fluid, such as water, in low pressure portion 70 of the power plant shown in FIG. 2. When water is the working fluid in portion 70 of the power plant, heat exchanger 66 will produce steam at about 40 deg. C. and a pressure at about 3.6 bar. This steam is applied to low temperature turbine 72 where the steam expands causing the turbine to produce work which is converted into electrical energy by generator 66 in the manner indicated previously. Steam exhausted from low temperature turbine 72 will be at about 0.07 bar and condenser 74 will condense this steam into liquid water. In this case, a liquid cooled condenser can be used and the condensate exits from the condenser at about 40 deg. C. Pump 76 returns the condensate to heat exchanger 66 and the cycle repeats.

The advantage gained in using compounds identified above in a power plant where the heat sources is a nuclear reactor can be illustrated quite simply by comparing the vapor pressure of various fluids at two convenient operating temperatures. As seen in the chart of FIG. 5 to which reference is now made, the vapor pressure of water is many times the vapor pressure of both tetralin and naphthalene and 1-methyl naphthalene. Thus, these compounds are ideally suited for a power plant where the heat source is a nuclear reactor.

Working fluids of the present invention are particularly suitable for power plants based on nuclear reactor heat sources because such fluids can perform multiple functions in a reactor. In addition to constituting the working fluid for the power plant, the working fluids of the present inventin can also function as the reactor moderator fluid and cooling fluid. This eliminates the need for a heat exchanger as well as leaks of great concern in heat exchangers.

The advantages and improved results furnished by the methods and apparatus of the present invention are apparent from the foregoing description of the various embodiments of the invention. Various changes and modifications may be made without departing from the spirit and the scope of the invention as described in the claims that follow.

What is claimed is:

1. In a Rankine cycle power plant having a boiler for vaporizing an organic working fluid which is applied to a turbine in which vaporized working fluid produced by the boiler expands and produces work, a condenser for condensing expanded vaporized working fluid exhausted by the turbine and producing condensate, and means for returning the condensate to the boiler, the improvement comprising:
   (a) operating the boiler so that the organic fluid vaporizes at substantially constant pressure and a temperature not exceeding 400° C.;
   (b) applying only vaporized working fluid to the turbine; and
   (c) using as the working fluid, a compound selected from the group consisting of bicyclic hydrocarbons, substituted bicyclic aromatic hydrocarbons, heterobicyclic aromatic hydrocarbons, substituted heterobicyclic aromatic hydrocarbons, bicyclic compounds where one ring is aromatic and the other condensed ring is nonaromatic, and their mixtures.

2. The invention of claim 1 wherein the working fluid is a mixture of compounds, said mixture having a freezing point which is lower than the freezing point of the compound having the highest freezing point.

3. The invention of claim 1 wherein the working fluid is quinoline.

4. The invention of claim 1 wherein the working fluid is naphthalene.

5. The invention of claim 1 wherein the working fluid is methyl naphthalene.

6. The invention of claim 1 wherein the working fluid is tetralin.

7. The invention of claim 1 wherein the working fluid is a mixture of tetralin and methyl naphthalene.

8. A binary Rankine cycle power plant comprising:
   (a) a first heat exchanger for vaporizing a first organic working fluid;
   (b) a first turbine and means for applying thereto only vaporized working fluid produced by the first heat exchanger for producing work when the first working fluid expands in the first turbine;
   (c) a second heat exchanger responsive to a second working fluid in liquid form for condensing the expanded vapors of the first working fluid into condensate and for vaporizing the second working fluid;
   (d) means for returning condensate produced by the second heat exchanger to the first heat exchanger;
   (e) a second turbine for expanding vaporized working fluid produced by the second heat exchanger and producing work;
   (f) a condenser for condensing the expanded vapors of the second working fluid exhausted by the second turbine to produce second working fluid condensate; and
   (g) means returning the second working fluid condensate to the second heat exchanger;
   (h) wherein said first working fluid is selected from the group consisting of bicyclic hydrocarbons, substituted bicyclic aromatic hydrocarbons, heterobicyclic aromatic hydrocarbons, substituted heterobicyclic aromatic hydrocarbons, bicyclic compounds where one ring is aromatic and the other condensed ring is nonaromatic, and their mixtures, and the first heat exchanger vaporizes said first working fluid at a temperature not exceeding about 400° C.

9. A binary Rankine cycle power plant according to claim 8 wherein the first heat exchanger includes a solar collector for heating the first working fluid.

10. A binary Rankine cycle power plant according to claim 9 wherein the first working fluid is tetralin.

11. A binary Rankine cycle power plant according to claim 10 wherein the second working fluid is an aliphatic hydrocarbon.

12. A binary Rankine cycle power plant according to claim 9 wherein the second working fluid is heptane.

13. A binary Rankine cycle power plant according to claim 8 wherein the first heat exchanger is in a form of a nuclear reactor.

14. A binary Rankine cycle power plant according to claim 13 wherein the first working fluid is naphthalene.

15. A binary Rankine cycle power plant according to claim 14 wherein the second working fluid is an aliphatic hydrocarbon.

16. A binary Rankine cycle power plant according to claim 14 wherein the second working fluid is water.

17. In a Rankine cycle power plant having a nuclear reactor heat source for vaporizing a working fluid that is supplied to a turbine, and a condenser for condensing vapor exhausted from the turbine, the improvement comprising constructing and arranging said heat source such that the working fluid is vaporized at substantially constant pressure and temperature not exceeding about 400° C., and the fluid acts as a moderator, coolant and working fluid, wherein only vaporized working fluid is supplied to the turbine, and wherein the working fluid is selected from a group consisting of bicyclic hydrocarbons, substituted bicyclic aromatic hydrocarbons, heterobicyclic aromatic hydrocarbons, substituted heterobicyclic aromatic hydrocarbons, bicyclic compounds where one ring is aromatic and the other condensed ring is nonaromatic, and their mixtures.

18. The Rankine cycle power plant as defined by claim 17 wherein said fluid which acts as a moderator is deuterated.

19. A binary Rankine cycle power plant according to claim 8 wherein said first heat exchanger is constructed and arranged to vaporize said first organic working fluid at substantially constant pressure.

20. The invention of claim 1 wherein the working fluid is a combination of methanol and quinoline.

21. The invention of claim 20 wherein the ratio of methanol to quinoline is about 0.6% by weight.

22. The invention of claim 1 wherein the working fluid is a combination of methanol and Tetralin.

23. The invention of claim 1 wherein the working fluid is a mixture of about 75% Tetralin and about 25% methyl naphthalene.

24. A binary Rankine cycle power plant according to claim 19 wherein said first heat exchanger includes a nuclear reactor that is constructed and arranged to vaporize said first working fluid at substantially constant pressure, and a temperature not exceeding about 400° C.

25. A binary Rankine cycle power plant according to claim 24 wherein the second working fluid is water.

* * * * *